Patented Nov. 19, 1946

2,411,359

UNITED STATES PATENT OFFICE 2,411,359

PLANT STIMULANT COMPOSITION AND METHOD

John H. Billman, Bloomington, Ind.

No Drawing. Application December 4, 1940,
Serial No. 368,506

16 Claims. (Cl. 47—58)

This invention relates to plant stimulants and is particularly directed to plant stimulant compositions containing as an essential active ingredient a carboxylic acid (free or combined) having the formula

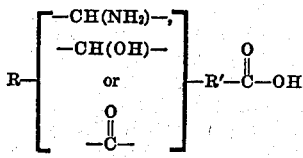

in which R is an aromatic hydrocarbon radical and R' is an aliphatic hydrocarbon radical containing preferably not more than 13 carbon atoms, and to methods in which the growth characteristics of plants are modified by application of these compounds.

The art of modifying plant growth by the application of artificial stimuli has in recent years been centered around the discovery of so-called plant hormones. Many materials have been discovered which when applied to plant structure in minute amounts acts as a stimulus to development of the plant. Simple chemical compounds that are easily synthesized have been found which stimulate root growth, which stimulate seed germination, and which in other ways modify the growth characteristics of plants. The discoveries by various workers in the art that such materials as indoleacetic acid, indolebutyric acid, indolepyruvic acid, naphthalene acetic acid, naphthalene butyric acid, phenylacetic acid, naphthalene glycolic acid, etc., have such properties has led to increased activity and intensive research in the art.

While numerous compounds have been tested as plant stimulants and a considerable number found to be effective, naphthalene acetic acid and its derivatives seems to be the only material which is both sufficiently effective and sufficiently cheap to be commercial. Even this material is difficult to synthesize so that much remains to be desired from an economic point of view. Additionally, naphthalene acetic acid does not have as wide range of tolerance as would be desirable. In other words, the difference between the effective concentration and that which causes injury to the plant is in many applications relatively small so that a degree of precision is required in its application which is not always easily obtained in view of the nature of the art.

I have now found that compounds in which an aromatic hydrocarbon radical is linked to the hydrocarbon residue of an aliphatic carboxylic acid other than formic acid through an aminomethylene, a hydroxymethylene or a carbonyl group have plant stimulating properties and may be used in various types of compositions and may be applied in different manners to modify the growth characteristics of plants in various ways. As compared with the prior art these compounds are safe, effective and readily available. They may be prepared by simple and effective synthesis. When applied in proper concentrations they have the same order of effectiveness as the prior art materials, and in some cases even greater effectiveness, and they may be applied in higher concentrations without deleteriously affecting the plants.

The compounds of this invention may be prepared from aromatic hydrocarbons such as benzene, naphthalene, acenaphthene, anthracene or phenanthrene and aliphatic dicarboxylic acids or their anhydrides or acyl halides by a Friedel-Crafts reaction. In case of naphthalene two isomers are obtained which can be separated by fractional crystallization. See Journal of the Chemical Society, p. 1125 (1932). These are the 1-naphthoyl and 2-naphthoyl acids, which respectively have the following formula:

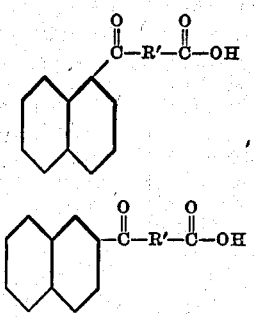

From the keto acids various derivatives may be prepared. Among these are the corresponding hydroxy acids and amino acids and the salts, amides and esters. The hydroxy and amino acids are related to the keto acids in that the hydroxy acid may be obtained from the keto acid by reduction and the amino acids by replacement of the hydroxyl. The salts, esters and amides may be obtained in a known manner and bear the relation to the acids that on hydrolysis they yield the free acid. I believe it is the acid which is the effective stimulant and such materials which are capable of yielding the free acid come within the scope of the invention. Hence when I use the term "acid" unqualified I mean to include both the free and the combined acid, the latter being those types of compounds, such as salts, esters, and amides, which are capable of hydrolyzing to the free acid.

The invention is not restricted to compounds obtainable by the particular method outlined, since they may be made by other methods of synthesis related chemically and functionally. They may be considered as substituted aliphatic carboxylic acids having the following formula

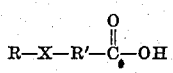

in which R is an aromatic hydrocarbon radical and R' is an aliphatic hydrocarbon radical containing preferably not more than 13 carbon atoms, and X is selected from the group consisting of aminomethylene, hydroxymethylene, and carbonyl groups. In this formula, for example, R can be phenyl, 1-naphthyl or 2-naphthyl, and R' can be methylene, ethylene, butylene, dodecylene, vinylene, butadienylene, ethylidene, isopropylidene or vinylidene.

The compounds of this invention may be used in a variety of ways as stimuli to modify the growth characteristics of plants. For example, they may be applied to seeds to stimulate root and plumule development or to stimulate germination. They may be applied to cuttings, transplants or tubers to stimulate root formation, or they may be applied to intact plants to prevent premature drop of fruit or foliage. They may induce parthenogenesis. In their various applications they may be used on seeds or mature plants to regulate the development of the plants when desired to avoid drought, frost and other adverse conditions, or to stimulate root activity in cuttings or transplanted plants or to modify the abscission cells to prevent premature drop. In all their applications they are applied to living plant cells in such concentrations as will alter the growth characteristics of the plant. In the application to seeds it is not known whether the action is to modify the seed per se or the plant which develops from the seed, and for the purpose of this invention it will be understood that the term "plant" as used herein and in the appended claims is intended to include seeds.

In the application of the compound for these various purposes different compositions may be employed. For the most part aqueous solutions will be found most desirable. These solutions may include wetting agents or adhesives, or both. Colloidal materials such as the soluble gums or resins may be included; also, water-soluble polymers such as polyvinyl alcohol. The compounds also may be applied in admixture with other diluents either as pastes or dusts. Thus the materials may be incorporated in oils, fats, or similar vehicles such as lanolin, or in a finely divided inert such as talc, flour, fuller's earth, clay or other soluble or insoluble, finely divided solids.

According to one form of my invention the compounds are applied to seeds. The seeds may be soaked in dilute aqueous solutions before planting or they may be soaked, dried and stored for future planting. A particular advantage of the invention lies in the fact that seeds so treated may be stored over long periods without deleterious effects and without loss of the stimulant action. The treated seeds may be expected to show one or more of the following characteristics: Higher percentage germination, a larger number of roots, greater root development and greater plumule development.

Other applications of the compounds of this invention to stimulate root development include applications to cuttings and transplants. In the application of the compounds to the simulation of root development they may be applied to corn seeds, peach seeds, soya bean seeds, or more generally to flower or vegetable seeds of many varieties, or they may be applied to bulbs and tubers or to cuttings or to intact plants. In these various applications the optimum concentration will vary according to the nature of the plant treated, the time of treatment, the compound used and the vehicle in which it is applied. In applications from aqueous solutions it will in general be found that the effective concentrations will fall within the limits of 1 to 120 milligrams per liter, in lanolin paste from 0.5 to 5 per cent, or in dust from 0.25 to 2 per cent. Greater or smaller concentrations may be used, but the effect diminishes as the concentration is increased or decreased beyond optimum, and in some cases too great a concentration may be expected to give negative results, ranging from retardation of growth to positive injury. Such applications as may be made for the purpose of retarding development of plants are part of the invention.

Specific applications which have been found to give satisfactory results include (1) soaking corn seed for 28 hours in aqueous solutions containing 7.5 milligrams of beta-1-naphthoylpropionic acid or beta-2-naphthoylpropionic acid in 950 cc. of water, (2) soaking corn seed for 8 hours in aqueous solution containing one milligram of beta-1-naphthoylpropionic acid, followed by drying for future planting, (3) soaking the fresh cut ends of cuttings of varieties carnation, chrysanthemum, or yew for 3½ hours in an aqueous solution containing 7.5 milligrams of beta-1-naphthoylpropionic acid per liter, or (4) dipping the cut end of like fresh cuttings in talc dust containing 1% of beta-1-naphthoylpropionic acid.

Seeds treated and dried may be stored over long periods before planting without loss of effectiveness. This has the advantage that the treatment may be applied by the seed distributor and also that the seeds are in condition to be planted from mechanical planters. In this treatment care should be taken to avoid germination. The temperature or the time, or both, may be suitably adjusted and the treated seeds should be given free access to air, preferably heated, as by spreading the seeds out or by subjecting them to blowers. The seeds may be sprayed and passed through a drier in a continuous operation.

Some of the advantages of the invention also may be realized if the seeds are treated in other ways. Thus, instead of impregnating the seeds from aqueous solution they may be treated with small quantities of the stimulant contained in a dusting composition, such as talc, flour or like finely divided inerts or as a liquid coating material in a volatile or non-volatile vehicle. Seed which are treated, whether from aqueous solution or from dust or otherwise, so as to contain but a modicum of the stimulant provide a new and important article of commerce.

According to another form of the invention the compounds may be applied to mature plants to prevent separation of parts by disintegration of the absciss layer.

Various parts of mature plants, such as leaves, flowers and fruit, are connected to the main body of the plant by a layer of abscission cells. It is deterioration of these cells which causes the separation of these parts from the plant proper. In the harvesting of various crops premature separation of these parts may cause serious loss.

Premature drop of this character may in some cases be prevented by the application of the stimulant in aqueous solution. Anti-drop treatments are of particular value in preventing premature drop of apples. Such treatments not only permit increased harvests of saleable apples but also admit of a longer ripening period necessary to good color. Application of sprays are made at the imminence of dropping, that is, when normal healthy fruit begins to drop. Application may be applied, for example, from ten days to three weeks before harvest. One spray is usually sufficient, but with some varieties two sprays may be desirable. These sprays are dilute aqueous solutions applied with the usual apparatus and in the customary manner of applying orchard sprays.

The concentration of the anti-drop sprays is very small and may be expressed in grams per hundred gallons or milligrams per liter. To obtain the desired concentrations it is first desirable to prepare standard compositions containing a large proportion of diluent in order that the sprays may be made up on the basis of pounds per hundred gallons or pints per hundred gallons. Standard compositions may be prepared by diluting the stimulant with a water-soluble, finely divided, inert solid or with a water-miscible solvent. Suitable compositions which can be used at the rate respectively of ½ lb. per hundred gallons and 1 pint per hundred gallons and have been found effective on such varieties as Stayman Winesap, Delicious, McIntosh and Williams are prepared by mixing 10 to 20 grams of beta-1-naphthoylpropionic acid per pound with a finely divided, water-soluble inert solid such as sodium sulfate, sodium carbonate, borax or sulfamic acid, or by dissolving beta-1-naphthoylpropionic acid in a water-miscible solvent such as ethyl alcohol in the proportions of 5 to 10 grams per pint.

While I have disclosed my invention with reference to particular applications it is to be understood that it is not limited in these respects but is directed to the application of the particular stimulants described in any manner which leads to the alteration of the growth characteristics of plants. The general characteristic of a plant stimulant is that of modifying development of the plant. They are not to be confused with fertilizers which are more properly a food and do not alter the growth characteristics of the plant. Nor are they to be confused with plant poisons which simply alter and destroy. Additionally, a plant stimulant is effective in minute amounts, the effective concentrations usually being easily set forth in parts per million or milligrams per liter.

The effectiveness of the compounds of the invention will vary according to their individual characteristics, according to the type of plant structure treated, according to the purpose of the treatment, and according to the vehicle from which it is applied. Beta-1-naphthoylpropionic acid, for example, appears more effective on corn seed than beta-2-naphthoylpropionic acid whereas on peach seeds and soya bean seeds it appears the reverse may be true. In aqueous solution the effective concentration may range from about 1 to 120 or more milligrams per liter, in lanolin paste from about 0.5 to 5 or more per cent, and in dusting powders from about 0.25 to 2 or more per cent. Likewise a different concentration may be required for one variety of plant as compared with another and the concentrations required for root growth stimulation while generally similar may not be the same as may be required for anti-drop treatment. Those skilled in the art having these various factors in mind will readily be able to determine conditions most suitable in any given case. Further than this, it can only be stated that when the materials are applied from aqueous dispersion (solution or otherwise) it will ordinarily be unnecessary or undesirable to employ more than 30 milligrams per liter. Any smaller amount which is sufficiently effective may be employed, and, as already pointed out, optimum conditions generally usually obtain at much smaller concentrations.

Since many apparently widely differing embodiments of the invention may be made it is to be understood that such modifications as come within the spirit of the invention are intended to be included within the scope of the claims.

I claim:

1. In the propagation of plants the method of altering the growth characteristics of the plant which comprises treating the plant structure with a compound selected from the class consisting of free carboxylic acids and compounds which on hydrolysis yield said acid, said acid being a carboxylic acid having the formula

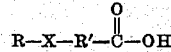

in which R is an aromatic hydrocarbon radical of the naphthalene series and R' is an aliphatic hydrocarbon radical, and X is selected from the group consisting of aminomethylene, hydroxymethylene and carbonyl and in which R is linked to X at the 2-position.

2. In the propagation of plants the method of altering the growth characteristics of the plant which comprises treating the plant with a carboxylic acid in which an aromatic hydrocarbon radical of the naphthalene series is linked at the 2-position to the hydrocarbon residue selected from the class consisting of an aliphatic carboxylic acid having less than fourteen carbon atoms and compounds which on hydrolysis yield said acid by means of a divalent group selected from the class consisting of aminomethylene, hydroxymethylene and carbonyl.

3. In the propagation of plants the method of altering the growth characteristics of the plant which comprises treating the plant structure with a compound selected from the class consisting of free carboxylic acids and compounds which on hydrolysis yield said acid, said acid being a carboxylic acid having the formula

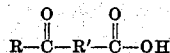

in which R is an aromatic hydrocarbon radical of the naphthalene series and R' is an aliphatic hydrocarbon radical containing not more than thirteen carbon atoms and in which R is linked to the carbonyl group at the 2-position.

4. In the propagation of plants the method of stimulating root growth which comprises treating at least that portion of the plant from which root growth is desired with a compound selected from the class consisting of free carboxylic acids and compounds which on hydrolysis yield said acid, said acid having the formula

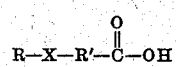

in which R is an aromatic hydrocarbon radical of the naphthalene series and R' is an aliphatic hydrocarbon radical, and X is selected from the group consisting of aminomethylene, hydroxymethylene and carbonyl and in which R is linked to X at the 2-position.

5. In the propagation of plants the method of stimulating root growth which comprises treating the same with a compound in which an aromatic hydrocarbon radical of the naphthalene series is linked at the 2-position to the hydrocarbon residue selected from the class consisting of an aliphatic carboxylic acid having less than fourteen carbon atoms and compounds which on hydrolysis yield said acid by means of a divalent group selected from the class consisting of aminomethylene, hydroxymethylene and carbonyl.

6. In the propagation of plants the method of stimulating root growth which comprises treating the same with a compound selected from the class consisting of free carboxylic acids and compounds which on hydrolysis yield said acid, said acid having the formula

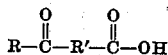

in which R is an aromatic hydrocarbon radical of the naphthalene series and R' is an aliphatic hydrocarbon radical and in which R is linked to the carbonyl group at the 2-position.

7. In the propagation of plants the method which comprises treating dormant seeds with a dilute aqueous dispersion of a plant stimulant selected from the class consisting of free carboxylic acids and compounds which on hydrolysis yield said acid, said acid having the formula

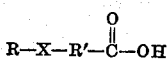

in which R is an aromatic hydrocarbon radical and R' is an aliphatic hydrocarbon radical, and X is selected from the group consisting of aminomethylene, hydroxymethylene and carbonyl in such concentration as to promote growth and drying the seeds while still in the dormant state.

8. In the propagation of plants the method which comprises treating dormant seeds with a dilute aqueous dispersion of a plant stimulant selected from the class consisting of free carboxylic acids and compounds which on hydrolysis yield said acid, said acid having the formula

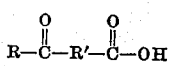

in which R is an aromatic hydrocarbon radical and R' is an aliphatic hydrocarbon radical containing not more than thirteen carbon atoms.

9. In the propagation of plants the method of altering the growth characteristics which comprises treating the plants with free beta-2-naphthoylpropionic acid.

10. In the propagation of plants the method of stimulating root growth which comprises treating at a portion of the plant from which the root growth is desired with free beta-2-naphthoyl propionic acid.

11. In the propagation of plants the method which comprises treating dormant seeds with a dilute aqueous dispersion of free beta-2-naphthoylpropionic acid in such concentration as to promote growth and drying the seeds while still in the dormant state.

12. In the propagation of plants the method of retarding growth which comprises treating the plant with free beta-2-naphthoylpropionic acid in a concentration sufficient to retard growth and insufficient to cause positive injury thereto.

13. In the propagation of plants the method of retarding growth which comprises treating the plant with a compound selected from the class consisting of free naphthoylpropionic acid and compounds which on hydrolysis yield said acid in a concentration sufficient to retard growth and insufficient to cause positive injury thereto.

14. In the propagation of plants the method of retarding growth which comprises treating the plant with a compound selected from the class consisting of free carboxylic acids and compounds which on hydrolysis yield said acid, said acid being a carboxylic acid having the formula

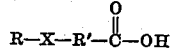

in which R is an aromatic hydrocarbon radical and R' is an aliphatic hydrocarbon radical, and X is selected from the group consisting of aminomethylene, hydroxymethylene and carbonyl, in a concentration sufficient to retard growth and insufficient to cause positive injury thereto.

15. A plant stimulant composition containing as an essential active ingredient an amide of a carboxylic acid having the formula

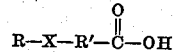

in which R is an aromatic hydrocarbon radical of the naphthalene series and R' is an aliphatic hydrocarbon radical, and X is selected from the group consisting of aminomethylene, hydroxymethylene and carbonyl, and in which R is linked to X at the 2-position.

16. A plant stimulant composition containing as an essential active ingredient an amide of a carboxylic acid having the formula

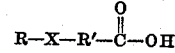

in which R is an aromatic hydrocarbon radical and R' is an aliphatic hydrocarbon radical, and X is selected from the group consisting of aminomethylene, hydroxymethylene and carbonyl in a water-soluble diluent selected from the class consisting of water-soluble finely divided inert solid material and substantially water-miscible solvent in the proportions of approximately 10 to 20 grams for each pound of solid material or each quart of solvent.

JOHN H. BILLMAN.